SAMUEL F. ESTELL, OF RICHMOND, INDIANA.

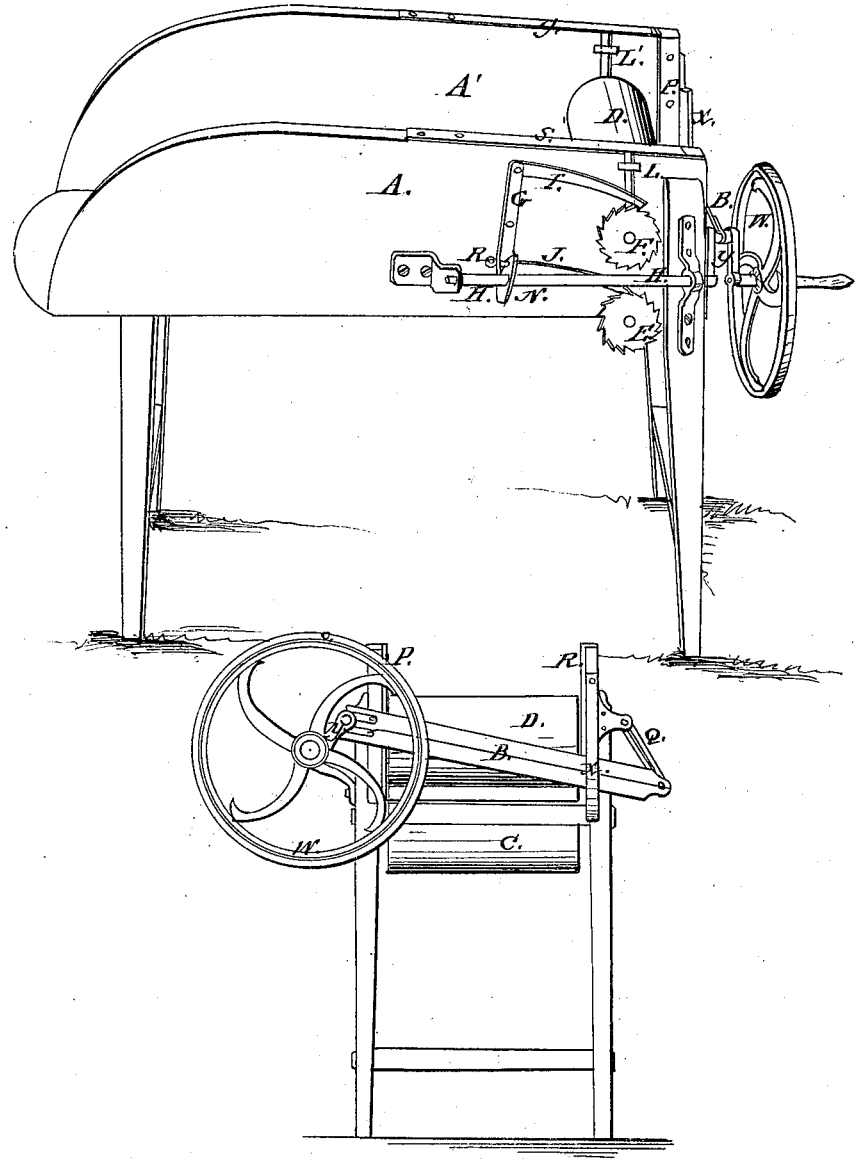

Letters Patent No. 88,023, dated March 23, 1869.

IMPROVEMENT IN STRAW-CUTTERS.

The Schedule referred to in these Letters Patent and making part of the same.

*To all whom it may concern:*

Be it known that I, SAMUEL F. ESTELL, of Richmond, in the county of Wayne, and State of Indiana, have invented certain new and useful Improvements in Straw-Cutters; and I do hereby declare that the following is a full and exact description thereof, reference being had to the accompanying drawings, making a part of this specification.

The nature of my invention relates to a novel method of actuating the feed-rollers; and also to the mode of attaching and operating the knife, whereby it receives a combined rotary and reciprocating motion.

To enable others skilled in the art to make and use my invention, I will proceed to describe the same, with reference to the drawings, in which—

Figure 1 is a perspective view of my improved straw-cutter, and

Figure 2 is an end elevation of the same.

The box is made in the usual form, and is provided with feed-rollers, C D, to which latter are attached the ratchet-wheels E F.

The journals of the lower feed-roller, C, revolve in stationary boxes, while those of the upper roller, D, revolve in vertical slots in the side-boards A A', and are held in position by means of pins, L L', placed upright in the slots, and impinging upon the springs S S'.

The shaft H is provided with a balance-wheel, W, and crank, Y, to which latter, one end of the knife B is attached, the other end being pivoted to the swinging arm Q.

By means of this mode of attachment, any point in the cutting-part of the knife will, in operation, describe an ellipse, this motion being due to the combined rotary and reciprocating motion which it receives.

The knife is kept in contact with the brace P by the crank Y and guard X.

The feed-rollers are actuated by means of a cam-wheel, N, placed upon the shaft H, and acting upon a pivoted bar, G, to the extremities of which are attached pawls, I J, that engage with the ratchet-wheels E F.

The cam-wheel N is adjusted to move between two projections on the pivoted bar G, in one of which is a set-screw, R, whereby the space in which the cam-wheel moves may be widened or diminished at pleasure, thereby regulating the length of the feed.

The bar G is pivoted at its central point, so that the feed-rollers are moved through equal arcs by each revolution of the cam.

Having thus fully described my said invention,

What I claim, and desire to secure by Letters Patent is—

1. The cam-wheel N, pivoted bar G, and pawls I J, when combined and operated substantially in the manner and for the purpose set forth.

2. In combination with the cam-wheel N, and pivoted bar G, the set-screw R, for regulating the feed, substantially as set forth.

3. The crank Y, knife B, and swinging arm Q, when combined and operated substantially as described.

SAMUEL F. ESTELL.

Witnesses:
 ISAAC STEPHENS,
 ARTEMAS ROBERTS.